US012769837B2

(12) United States Patent
Briongos et al.

(10) Patent No.: US 12,769,837 B2
(45) Date of Patent: Oct. 20, 2026

(54) METHOD AND HOST SYSTEM FOR SECURE ENCLAVE MIGRATION

(71) Applicant: NEC Laboratories Europe GmbH, Heidelberg (DE)

(72) Inventors: Samira Briongos, Heidelberg (DE); Claudio Soriente, Heidelberg (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 231 days.

(21) Appl. No.: 18/704,474

(22) PCT Filed: Oct. 27, 2021

(86) PCT No.: PCT/EP2021/079884
§ 371 (c)(1),
(2) Date: Apr. 25, 2024

(87) PCT Pub. No.: WO2023/072390
PCT Pub. Date: May 4, 2023

(65) Prior Publication Data
US 2025/0007897 A1 Jan. 2, 2025

(51) Int. Cl.
*G06F 21/57* (2013.01)
*H04L 9/40* (2022.01)
*G06F 9/455* (2018.01)

(52) U.S. Cl.
CPC .......... *G06F 21/57* (2013.01); *H04L 63/0428* (2013.01); *G06F 2009/4557* (2013.01)

(58) Field of Classification Search
CPC ............. G06F 21/57; G06F 2009/4557; H04L 63/0428
See application file for complete search history.

(56) References Cited

U.S. PATENT DOCUMENTS

2018/0183580 A1 6/2018 Scarlata et al.
2018/0211035 A1 7/2018 Costa
(Continued)

FOREIGN PATENT DOCUMENTS

JP 2010257209 A 11/2010
JP 2020505698 A 2/2020
JP 2020505701 A 2/2020

OTHER PUBLICATIONS

Alder et al. Migrating SGX Enclaves with Persistent State Mar. 29, 2018 arXiv:1803.11021 (Year: 2018).*
(Continued)

*Primary Examiner* — David J Pearson
(74) *Attorney, Agent, or Firm* — Leydig, Voit & Mayer, Ltd.

(57) ABSTRACT

A method for enabling enclave migration is provided, where the contents of the enclave and its sealed data are transferred from a sending host to a receiving host. An attestation is performed between a security monitor of the sending host and a security monitor of the receiving host, where the attestation includes an exchange of a shared cryptographic key K between the two security monitors. The shared cryptographic key K is used to implement a secure communication channel between the two security monitors. The two security monitors execute, via the secure communication channel, a predetermined transfer protocol. The predetermined transfer protocol includes an initial exchange of verification messages between the security monitors to verify that both security monitors are ready and can execute the transfer, and a subsequent transfer of enclave data between the security monitors.

19 Claims, 3 Drawing Sheets

(56) References Cited

U.S. PATENT DOCUMENTS

| | | | | |
|---|---|---|---|---|
| 2018/0212966 | A1* | 7/2018 | Costa | H04L 63/10 |
| 2018/0212971 | A1 | 7/2018 | Costa | |
| 2019/0228135 | A1* | 7/2019 | Jin | G06F 11/0757 |
| 2019/0243963 | A1* | 8/2019 | Soriente | H04L 9/3247 |
| 2019/0377598 | A1 | 12/2019 | Xia et al. | |
| 2020/0151366 | A1* | 5/2020 | Chen | G06F 21/64 |
| 2020/0234275 | A1* | 7/2020 | Zhang | G06F 21/53 |
| 2021/0019166 | A1 | 1/2021 | Kataria et al. | |
| 2021/0173685 | A1* | 6/2021 | Tsirkin | H04L 9/0825 |

OTHER PUBLICATIONS

Gu et al. Secure Live Migration of SGX Enclaves on Untrusted Cloud 2017 47th Annual IEEE/IFIP International Conference on Dependable Systems and Networks Jun. 26-29, 2017 (Year: 2017).*

* cited by examiner

METHOD AND HOST SYSTEM FOR SECURE ENCLAVE MIGRATION

CROSS REFERENCE TO RELATED APPLICATIONS

This application is a U.S. National Phase application under 35 U.S.C. § 371 of International Application No. PCT/EP2021/079884, filed on Oct. 27, 2021. The International Application was published in English on May 4, 2023 as WO 2023/072390 A1 under PCT Article 21(2).

FIELD

The present invention relates to a method for enabling migration of the contents of an enclave and its sealed data from a first machine—sending host—to a second machine—receiving host.

Furthermore, embodiments of the present invention relate to a computational platform for enabling migration of the contents of an enclave and its sealed data to another computational platform.

BACKGROUND

Trusted Execution Environments (TEEs) enable applications to run in isolation from any other software on the same platform, including a potentially malicious hypervisor or Operating System. Applications are loaded into so-called enclaves and access control to an enclave contents is protected by the underlying hardware. In particular, runtime enclave memory (i.e., DRAM, Dynamic Random Access Memory) is encrypted with hardware-dependent keys that never leave the processor.

Furthermore, hardware platforms that implement TEEs feature other services such as remote attestation or sealing. Remote attestation enables remote parties to obtain verifiable statements on the software configuration of an enclave and on the hardware of the platform where the enclave is deployed; as a by-product of most remote attestation protocols, the TEE and the remote party establish a secure channel by means of a shared cryptographic key. Sealing enables enclaves to save data on persistent storage in such a way that saved date is only available to the enclave itself; this is achieved by encrypting and authenticating data with hardware-managed keys that are both platform and enclave unique.

Enclave management and orchestration is entrusted to a thin software layer that runs right on top of the hardware and assumes different names, depending on the TEE instantiations. For example, this layer is named firmware or secure monitor in ARM TrustZone platforms and is in charge of controlling which applications run in the "secure world" and switching between so-called secure and normal world; in Intel SGX platform the software layer is distributed across a set of "system enclaves". Embodiments of the present invention focus on enclaves built on top of a Risc-V instruction set architecture. The thin layer responsible of managing application enclaves is referred to herein as the Security Monitor (SM).

Previous work has shown that cloning an application running in an enclave, i.e., running multiple instance of the same application enclave concurrently, may represent an effective attack avenue to drive the application behavior. Further, application migration may represent a means to obtain multiple clones of a victim application. In particular, an adversary may start the migration of a victim application from a sending host to a receiving host without stopping the execution of the migrated application on the sending host. As a result, two instances of the same application would run concurrently, one on each of the hosts.

SUMMARY

In an embodiment, the present disclosure provides a method for enabling enclave migration, wherein the contents of the enclave and its sealed data are transferred from a sending host, the sending host being a first machine, to a receiving host, the receiving host being a second machine, the method comprising: performing attestation between a security monitor of the sending host and a security monitor of the receiving host, wherein the attestation comprises an exchange of a shared cryptographic key K between the two security monitors; using the shared cryptographic key K to implement a secure communication channel between the two security monitors; executing, by the two security monitors via the secure communication channel, a predetermined transfer protocol, the predetermined transfer protocol comprising: an initial exchange of verification messages between the security monitors to verify that both security monitors are ready and can execute the transfer, and a subsequent transfer of enclave data between the security monitors.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
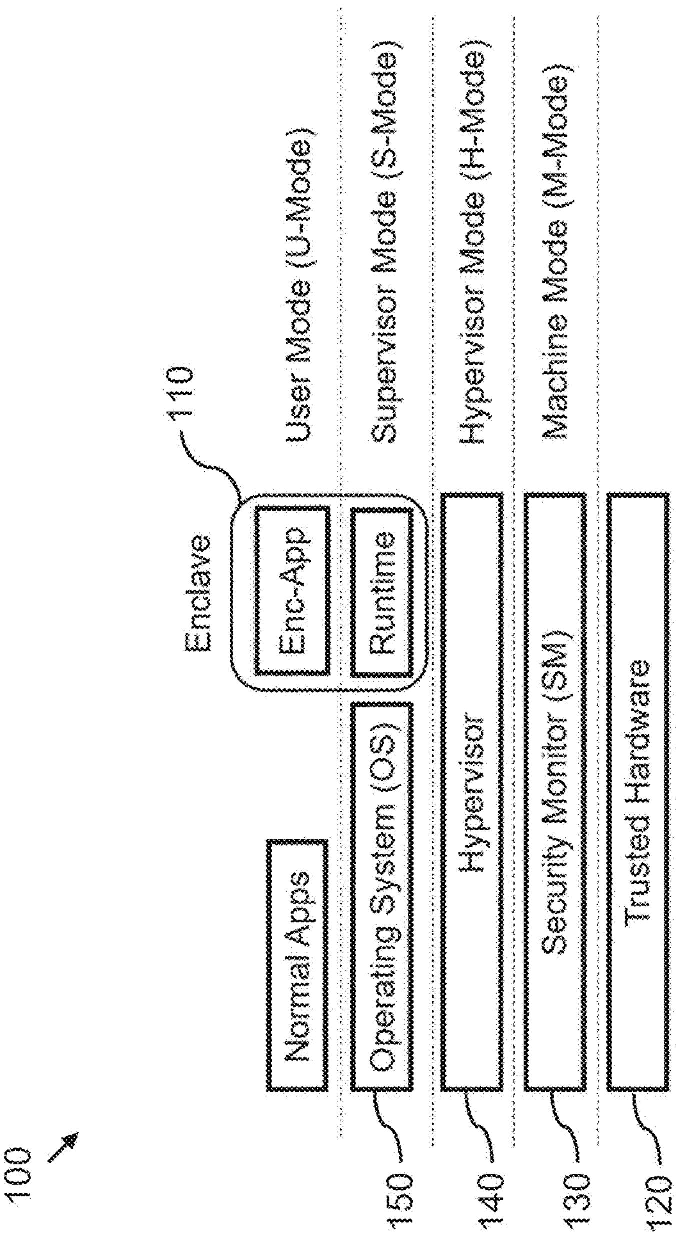
FIG. 1 is a schematic view illustrating the general concept of a Risc-V instruction set architecture.

In accordance with an embodiment, the present invention improves and further develops a method and a computational platform for enclave migration of the initially described type in such a way that the enclave's confidentiality and integrity is preserved.

In accordance with another embodiment, the present invention provides a method for enabling enclave migration, wherein the contents of the enclave and its sealed data are transferred from a first machine, which is a sending host, to a second machine, which is a receiving host. The method comprises performing attestation between a security monitor of the sending host and a security monitor of the receiving host including an exchange of a shared cryptographic key K between the two security monitors; using the shared cryptographic key K to implement a secure communication channel between the two security monitors; executing, by the two security monitors via the secure communication channel, a predetermined transfer protocol. The transfer protocol includes an initial exchange of verification messages between the security monitors to verify that both security monitors are ready and can execute the transfer, and a subsequent transfer of the enclave data between the security monitors.

Furthermore, in accordance with another embodiment, the present invention provides a computational platform, comprising an operating system, a hardware component, an enclave enabling applications to run in isolation from any other software running on the platform, the access control to the enclaves' contents being protected by the hardware component, and a security monitor implemented on top of the hardware component and configured to perform enclave management and orchestration. The security monitor is further configured to perform attestation with a security monitor of a receiving host and exchange a shared cryptographic key K with the security monitor of the receiving host, to use the shared cryptographic key K to implement a secure communication channel with the security monitor of the receiving host, to execute via the secure communication channel a predetermined transfer protocol with the security monitor of the receiving host, the transfer protocol including an initial exchange of verification messages between the security monitors to verify that both security monitors are ready and can execute the transfer, and a subsequent transfer of the enclave data between the security monitors.

According to the invention, it has been recognized that the migration process of the runtime memory of an enclave and its sealed data can be secured against cloning by ensuring atomicity. As such, embodiments of the present invention allow the live migration of an application running in a TEE, from one host to another, while keeping its contents confidential and unmodified, and while ensuring that the application being migrated cannot run on both hosts for a period longer than the network delay on both hosts. For instance, the migration may take place in public clouds.

According to embodiments of the invention, timeouts defining a maximum admissible time duration for particular steps of the transfer protocol may be implemented both for the initial exchange of the verification messages and for the subsequent transfer of the enclave data. More specifically, according to embodiments of the invention, in order to ensure that it is not possible for two machines/computational platforms to run two clones of the enclave simultaneously, the transfer protocol leverages different timeouts that, if exceeded, will cause the migration operation to abort. In other words, the transfer protocol is aborted if any of the implemented timeouts exceeds a maximum admissible time duration for particular steps of the transfer protocol, both in relation to the initial exchange of the verification messages as well as in relation to the subsequent transfer of the enclave data.

According to an embodiment, the timeout for the transfer of enclave data may be defined to include the network delay between the two security monitors being involved, the time may be required by the other party to prepare the respective response according to the transfer protocol, and a tolerance margin (for instance, a certain percentage of the network delay).

According to an embodiment, the initial exchange of verification messages between the security monitors may include sending, by the security monitor of the sending host, a prepare message to the security monitor of the receiving host, and sending, by the security monitor of the receiving host in reply to the prepare message, a ready message to the security monitor of the sending host. The prepare message may inform the other party of the upcoming transfer and may also indicate the size of the enclave to be transferred. The ready message may indicate the other party's readiness to receive the enclave to be transferred.

According to an embodiment, the subsequent transfer of the enclave data between the security monitors include decrypting, by the security monitor of the sending host, the set of DRAM pages (briefly denoted D herein) and the data saved on persistent storage S (briefly denoted S herein) that belongs to the enclave to be transferred; then re-encrypting D and S by using the shared cryptographic key K; and sending encrypted D and S to the security monitor of the receiving host.

According to an embodiment, the security monitors may be enhanced with direct access to a trusted timer properly implemented in hardware of the respective computational platform. In this context, it may be provided that the security monitors observe the implemented timeouts by means of trusted timer. The trusted timer may be implemented in form trusted clock source that is secured against time alterations effected by a malicious operating system.

In order to detect manipulations of the timer effected by removing the power from the computational platform (i.e. from the respective chip/processors of the computational platform), it may be provided that a temporal variable is instantiated in the runtime memory of each of the security monitors in such a way that the variable is overwritten each power cycle.

According to an embodiment, it may be provided that the number of allowed clones of enclave applications are defined and documented by using a manifest file of the enclave where these details are specified. In other words, the enclave applications may be augmented with a manifest file that provides configuration information, including the maximum number of application instances that are allowed to run concurrently on a host. In this context it may be provided that the security monitor keeps a per application counter that tracks the number of instances of the respective application deployed on the platform. The security monitor of a platform may reject any request from the operating system of the platform to deploy a new instance, if the number of running instances has reached a threshold defined in the manifest file of the respective application.

According to an embodiment, the computational platform may be configured to keep consistent state on the status of the transfer protocol by means of a Crash Fault Tolerant (CFT) storage. The CFT storage may be run by a set of three or more security monitors including the security monitors of the sending and receiving host. Such implementation can tolerate that up to the half of the security monitors of the implemented set are arbitrarily Byzantine, and that exchanged messages are arbitrary delayed by the adversary.

According to an embodiment, the transfer protocol may be triggered by the security monitor of the sending host upon request of the hypervisor of the sending host.

With respect to a particularly reliable key management, it may be provided that two cryptographic keys are derived from the shared cryptographic key K, wherein a first one of the derived keys is used for authenticating communication via the secure communication channel and wherein a second one of the derived keys is used for encrypting communication via the secure communication channel.

There are several ways how to design and further develop the teaching of the present invention in an advantageous way. To this end it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

A system model as envisioned according to embodiments of the present invention is schematically illustrated in FIG. 1. More specifically, FIG. 1 depicts an enclave 110 built on top of a Risc-V instruction set system 100.

Risc-V defines different privilege levels as shown in FIG. 1. On top of the trusted hardware 120, the security monitor (SM) 130 runs at the most privileged mode, which is the machine mode (or simply M-Mode). Therefore, the firmware or code running in this mode is included in the Trusted Computing Base (TCB) of the system 100.

The hypervisor layer 140 implemented on top of the security monitor 130 may be required for cloud environments but it may not exist in other scenarios, for example, in a group of servers managed by a company which do not implement virtualization.

The security monitor 130 is the interface between the enclave 110 and the untrusted platform components. It can delegate some tasks to the Operating System (OS) 150 or the hypervisor 140, such as virtual memory management and process scheduling. Nevertheless, the security monitor 130 oversees tasks, such as enclave deployment.

Migration of a TEE application from a sending host to a receiving host may require coordination between the security monitors 130 running on each of the hosts. In particular, the two security monitors 130 must agree on a secure channel, instantiated by means of a cryptographic key, say K, agreed upon by the two monitors 130. The security monitor 130 on the sending host (in the sequel referred to as security monitor 130S) encrypts both DRAM pages and sealed data of the application to be transferred under key K and sends it to the security monitor 130 on the receiving host (in the sequel referred to as security monitor 130R). It should be noted that in order to do so, the security monitor 130S on the sending host must have access to the hardware-managed keys used to encrypting the DRAM pages and the sealed data of the application to be transferred. The security monitor 130R on the receiving host decrypts the application DRAM pages and sealed data by using key K, before deploying the application on the receiving host. This is roughly the migration technique available in AMD Secure Encrypted Virtualization to migrate virtual machines running in enclaves across platforms.

Embodiments of the present invention enhance the security of TEE applications by ensuring that the number of running instances on a given host does not exceed a threshold chosen by the developer, and that, during the migration of an instance from one host to another, the instance being migrated can run on both hosts only for a period of time bounded by the network delay between the two hosts. As such, embodiments of the present invention enable migration of TEE applications across hosts while ensuring that no clone-based attacks take advantage of the migration functionality.

Embodiments of the present invention augment the application with a manifest file that provides configuration information, including the developer-defined maximum number of application instances that can run concurrently on a host. Further, embodiments of the invention enhance the security monitor on a host with access to a secure timer and implements a communication protocol between the two security monitors to ensure that the migrated application on the receiving host starts its execution if and only if the same application on the sending host has been dismissed.

Figure 2:
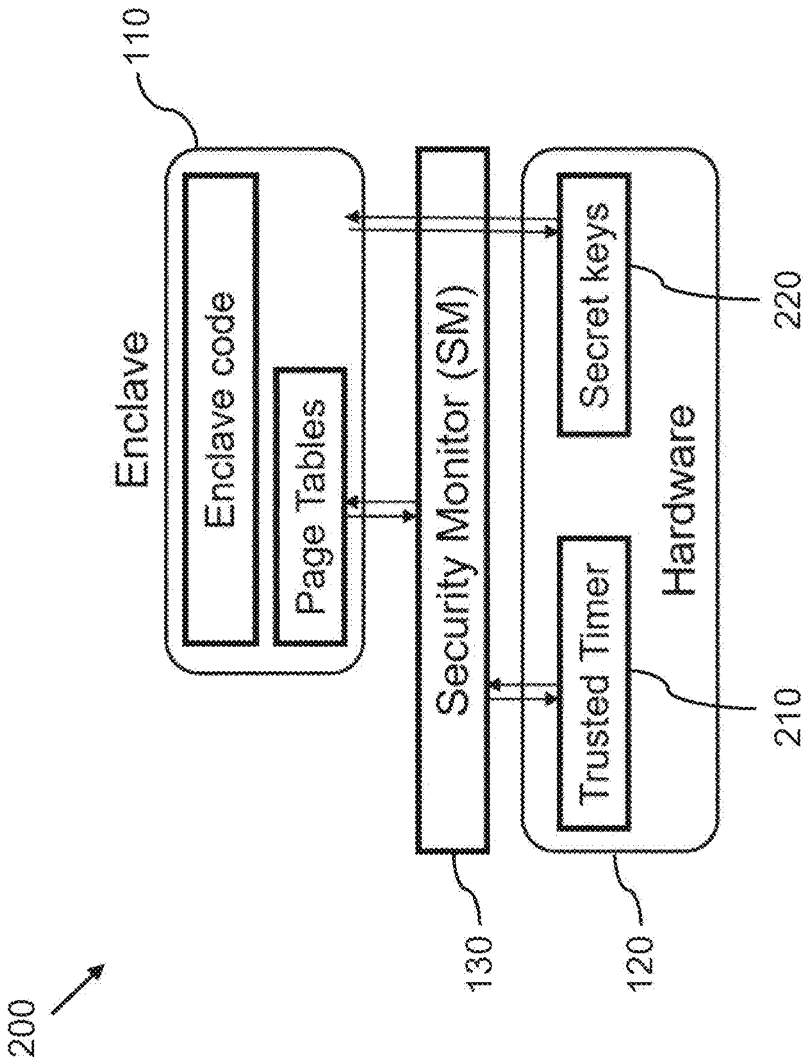
FIG. 2 is a schematic view illustrating an enclave running on a host implemented in accordance with an embodiment of the present invention.

FIG. 2 shows a machine 200 together with a general overview of elements and functional components (as well as some relations between them) that may be implemented and utilized to realize embodiments of the present invention. Unless mentioned otherwise, like components and functions are denoted with like reference numbers as in FIG. 1. For the ease of illustration, components of the host not necessarily required to understand the invention (such as, e.g., the operating system or the hypervisor) have been omitted in FIG. 2. In the context of embodiments of the present invention, the machine 200 may function both as sending host and as receiving host.

In the illustrated embodiment, the machine 200 comprises a security monitor 130 that is enhanced with direct access to a trusted timer 210 that is implemented in hardware 120. The security monitor 130 can also trigger encryption/decryption operations with the hardware-managed keys 220; the security monitor 130 cannot, however, read those keys 220 directly, so to prevent these keys 200 from being exfiltrated.

In one embodiment, the present invention augments TEE applications with a manifest file supplied by the application developer along with the application code. The manifest file may include various configuration parameters as well as a maximum number of application instances that can run on the respective host simultaneously. Accordingly, the security monitor 130 may be configured to keep a per application counter that tracks the number of instances deployed on the respective host 200. Every time a new instance of the application is started, the counter is increased; every time an instance is dismissed, the counter is decreased. Every time the OS requests the security monitor 130 to deploy a new instance, the security monitor 130 rejects the request if the number of running instances has reached the threshold defined in the manifest file.

Figure 3:
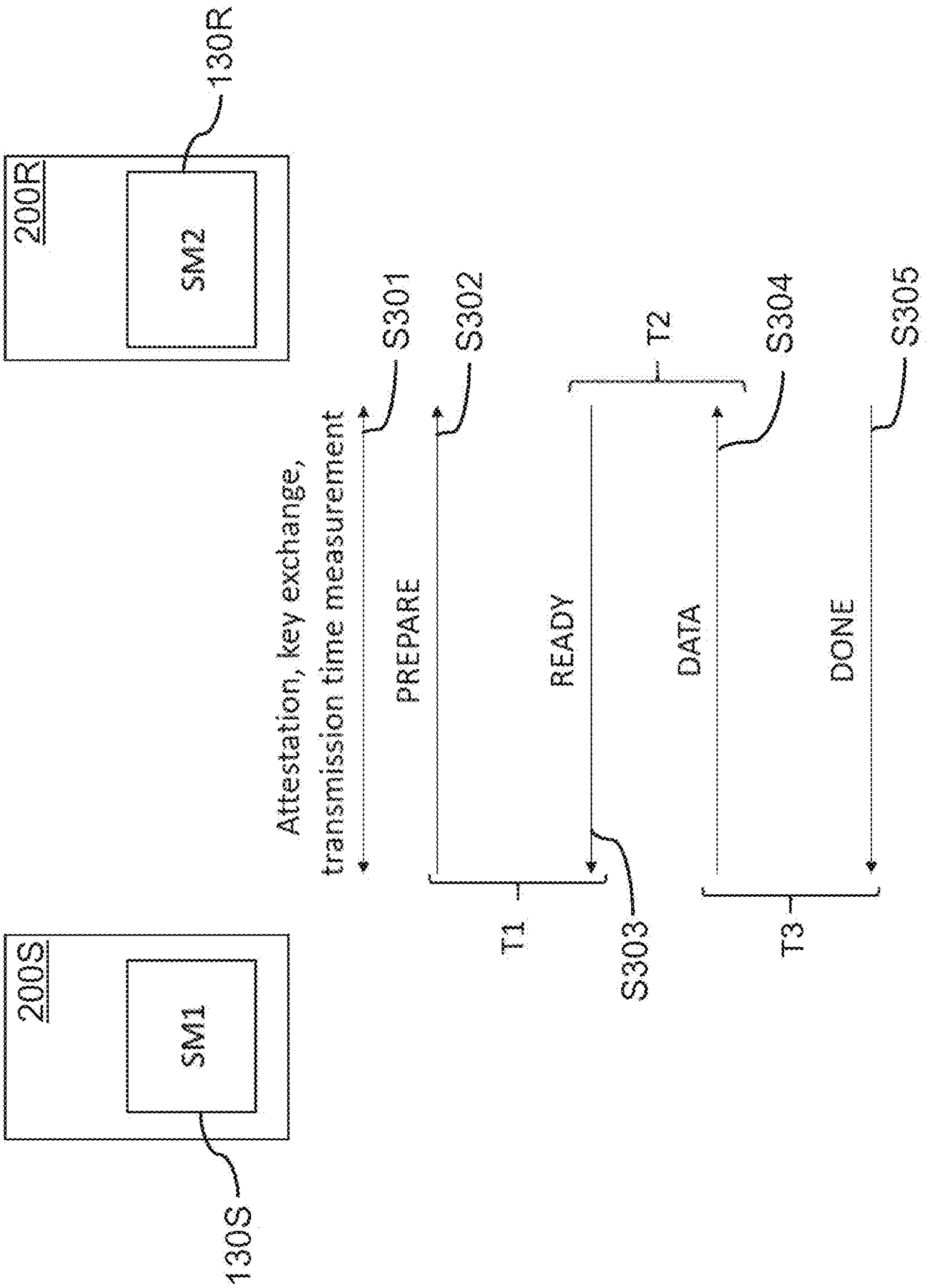
FIG. 3 is a schematic view illustrating a protocol for carrying out live TEE migration in accordance with an embodiment of the present invention.

According to further embodiments, the security monitor 130 is enhanced with a logic to carry out live TEE migration. FIG. 3 shows the steps of the respective protocol according to an embodiment. The protocol may be triggered by the security monitor 130S (shown as $SM_1$ in FIG. 3) on the sending host 200S, upon request of the hypervisor of the sending host 200S. $SM_1$ 130S may first attest the security monitor 130R (shown as $SM_2$) on the receiving host 200R. Attestation provides $SM_1$ with the guarantee that $SM_2$ is a genuine security monitor running on a TEE-enabled platform and that it may fulfill all the requirements specified by the developer. As a by-product, the two security monitors 130S, 130R obtain a shared cryptographic key, say K, used to implement a secure communication channel. In FIG. 3, attestation and key exchange are shown at step S301. All subsequent communication between the two security monitors 130S, 130R will happen over the communication channel, i.e., all transferred data will be encrypted and authenticated with the shared cryptographic key K. If needed, multiple cryptographic keys, e.g., one for authentication and one for encryption, may be derived from the shared cryptographic key K by using the shared cryptographic key as input to a deterministic function.

In order to ensure that it is not possible for two machines to run two clones of the enclave simultaneously, the protocol according to embodiments of the invention leverages different timeouts that, if exceeded, will cause the migration operation to abort. To this end, the SM 130 is provided access to a trusted timer 210, as shown in FIG. 2. In other words, the SM 130 has access to a clock source included on the respective chip/processor. It should be noted that such source of time cannot be manipulated by a malicious OS 150 or hypervisor 140, given that the security monitor 130 runs at the highest privilege level. As a result, the only way to manipulate the timer output is to remove the power of the processor.

According to embodiments of the invention, such manipulations may be detected by instantiating a temporal variable in the runtime memory of the SM 130 that is overwritten each power cycle. Thus, any change on this variable between time measurements indicates manipulation of the power source, and a possible problem, e.g., a crash or a malicious party attempting to attack the migration process.

According to embodiments of the invention, the protocol shown in FIG. 3 is designed in such a way that either all the steps are executed or nothing happens, thereby ensuring atomicity. It is assumed that both security monitors 130S, 130R are "crash only", i.e., they are configured to follow the protocol specifications, but may fail due to, e.g., power failures. Furthermore, messages sent from one SM to another are supposed to be received within a pre-defined time interval. Thus, each of the security monitors 130S, 130R can define timeouts when expecting a message from the other party: if the message is not received by the timeout, the other party is considered as crashed.

In the following, each time one party sends a message, it also starts a timer and sets a timeout to define the maximum delay for the response to arrive. According to embodiments, the timeout may include the network delay between the two parties, the time needed by the other party to prepare the response, and a tolerance margin (e.g., 10% of the network delay).

According to an embodiment, after attestation, $SM_1$ may identify the set of DRAM pages (briefly denoted D hereinafter) and the data saved on persistent storage (briefly denoted S hereinafter) that belongs to the enclave to be transferred. It also fetches the cryptographic keys that the processor is currently using to encrypt D and S. Next, $SM_1$ decrypts D and S and re-encrypts them by using K. Encrypted D and S are transferred to $SM_2$, which eventually will continue the execution of the transmitted enclave.

According to an embodiment of the invention, the entire process may be implemented as follows:

1. The hypervisor 140 on the host 200S where SM1 is running sends a request to SM1 to migrate a specific enclave to the host 200R where SM2 is running.
2. SM1 and SM2 attest each other, agree on a cryptographic key K, and measure the network delay between their respective hosts 200S, 200R, as shown at step S301 in FIG. 3.
3. SM1 sends a PREPARE message to SM2, as shown at S302. The PREPARE message may also include the size of the enclave to be transferred. Furthermore, SM1 starts a timer with timeout T1. If the timer reaches the timeout and the next expected message (READY) from SM2 has not arrived, SM1 sends an ABORT message (not shown), aborts the operation and ignores any posterior message it may receive from SM2.
4. Upon reception of message PREPARE from SM1, security monitor SM2 sends a READY message to SM1, as shown at S303. SM2 also starts a timer with timeout T2. If the timer reaches the timeout and the next expected message (DATA) from SM1 has not arrived, SM2 sends an ABORT message (not shown), aborts the operation and ignores any posterior message it may receive from SM1.
5. Upon reception of message READY from SM2, security monitor SM1 triggers the hardware to decrypt the DRAM pages of the enclave to be transferred as well as its sealed data. Decrypted data is then encrypted under key K. The resulting ciphertext is sent to SM2 in a DATA message, as shown at S304. SM1 also starts a timer with timeout T3. If the timer reaches the timeout and the next expected message (DONE) from SM2 has not arrived, SM1 sends an ABORT message (not shown), aborts the operation and ignores any posterior message it may receive from SM2.
6. Upon reception of message DATA from SM1, security monitor SM2 uses key K to decrypt the received data and triggers the hardware encryption routine to deploy the enclave DRAM pages and sealed data. Next, SM2 sends message DONE to SM1, as shown at S305) and concludes the migration protocol.
7. Upon reception of the message DONE from SM2, security monitor SM1 removes the DRAM pages and sealed data of the enclave just transferred and concludes the migration protocol.

For the protocol described above to work properly, it is important that there is a trusted source of time on SM1 to measure the timeout. According to embodiments of the invention, this may be implemented by feeding the output of the chip frequency oscillators directly into a set of counting registers. This signal is the same as the one that is fed to the frequency dividers and multipliers from which is obtained the CPU clock at different frequencies. As will be appreciated by those skilled in the art, this means that the SM clock is independent of the CPU frequency and its frequency cannot be changed. Such set of registers can only be configured or read by the SM and any other access, e.g. by a process not running in Machine Mode, will be blocked, i.e. neither the OS nor the hypervisor have access to the set of registers, since they do not have enough privileges. According to an embodiment, one of the registers may be configured to keep increasing while the CPU is powered, whereas the others may be written by the SM with the value corresponding to the end of the count at which the SM wants to be notified, i.e. the timeouts T1 and T3 (for SM1) and the timeout T2 (for SM2) in the case exemplarily described above. The counts of the registers can be stopped and reset by the SM, e.g. in case the respective message has arrived on time and the respective timer is no longer needed.

According to a further embodiment, in case the adversary can control the network, the migration protocol may rely on a Crash Fault Tolerant (CFT) storage that can keep consistent state on the status of the migration protocol-thereby allowing SM1 and SM2 to achieve an atomic migration. More specifically, embodiments of the invention provide a CFT layer L that is run by a set of other security monitors, wherein the set includes more than three security monitors including $SM_1$ and $SM_2$. L can tolerate that up to ½ of those monitors are arbitrarily Byzantine and that exchanged messages are arbitrary delayed by the adversary. In this context, according to an embodiment, the migration protocol may unfold as follows (wherein the used terminology is the same as the one used in connection with the protocol of FIG. 3):

1. SM1 sends an authenticated, fresh, and encrypted 'PREPARE SM2' message to L. This serves to check that SM2 is well alive and ready to receive the transfer.
2. Upon reception of the 'PREPARE SM2' message, SM2 replies with an authenticated, fresh, and encrypted 'SM2 READY' message to L. This indicates that it is ready to receive the transfer.
3. Upon reception of the 'SM2 READY' message, SM1 sends D and M, encrypted with key K directly to SM2 and sends a message 'SENT from SM1' to L.
4. Upon reception of the last message, SM2 decrypts D and M, re-encrypts them with the local enclave key and stores them on persistent storage. SM2 then sends an authenticated, fresh, and encrypted message 'SM2 DEPLOYED' to L.

5. Upon reception of the 'SM2 DEPLOYED' message, SM1 suspends its enclave and sends an authenticated, fresh, and encrypted message OK to L.

This protocol assumes that if a security monitor crashes it can crash at any point and that the adversary can also control the network. While messages could be delayed in the network due to congestion, they are likely to arrive within a timeout T. If a message does not arrive within a timeout T, all parties may assume that the sending node has crashed. In case the protocol does not fully terminate, both parties SM1 and SM2 abort the migration process and SM1 is the default party that keeps running the enclave to be migrated. In this case, SM1 sends to L an authenticated, fresh, and encrypted ABORT message.

To summarize, according to embodiments the present invention provides a method for enabling the live-migration of the contents of an enclave and its sealed data between different machines preserving their confidentiality and integrity and avoiding the creation of clones, the method comprising the steps of 1) Attestation between the sender SM (130S) and the receiver SM (130R) and key exchange.
2) Transmission of messages and data according to a predefined transfer protocol that ensures atomicity and uses different timeouts:
   a) Exchange some messages to verify both sender and receiver are ready and can execute the operation.
   b) Transference of the actual data of the enclave (runtime and sealed data).

Depending on the underlying system/platform, the method may be enhanced by the following options:

Modify the enclave architecture in Risc-V environments to include a manifest file where the maximum number of clones is specified by the developer.

Give access to the Security Monitor to a trusted timer to set timeouts during the transmission of the data according to the invention protocol.

Enhance the SM either with hardware logic or a software module to allow it to encrypt or decrypt enclaves with hardware-managed keys.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enabling enclave migration, wherein the contents of the enclave and its sealed data are transferred from a sending host, the sending host being a first machine, to a receiving host, the receiving host being a second machine, the method comprising:

performing attestation between a security monitor of the sending host and a security monitor of the receiving host, wherein the attestation comprises an exchange of a shared cryptographic key K between the two security monitors;

using the shared cryptographic key K to implement a secure communication channel between the two security monitors;

executing, by the two security monitors via the secure communication channel, a predetermined transfer protocol, the predetermined transfer protocol comprising:

an initial exchange of verification messages between the security monitors to verify that both security monitors are ready and can execute the transfer, and a subsequent transfer of enclave data between the security monitors, wherein timeouts defining a maximum admissible time duration for particular steps of the predetermined transfer protocol are implemented both for the initial exchange of the verification messages and for the subsequent transfer of the enclave data, wherein the predetermined transfer protocol is aborted if any of the implemented timeouts gets exceeded, and wherein a timeout for the transfer of enclave data is defined to comprise a network delay between the two security monitors, a time required by another party to prepare a respective response according to the predetermined transfer protocol, and a tolerance margin.

2. The method according to claim 1, wherein the initial exchange of verification messages between the security monitors comprises:

sending, by the security monitor of the sending host, a prepare message to the security monitor of the receiving host, wherein the prepare message indicates a size of the enclave to be transferred; and sending, by the security monitor of the receiving host in reply to the prepare message, a ready message to the security monitor of the sending host, wherein the ready message indicates a readiness of the security monitor of the receiving host to receive the enclave to be transferred.

3. The method according to claim 1, wherein a subsequent transfer of the enclave data between the security monitors comprises:

decrypting, by the security monitor of the sending host, a set of DRAM pages D and data saved on persistent storage S that belongs to the enclave to be transferred;

re-encrypting D and S using the shared cryptographic key K; and sending encrypted D and S to the security monitor of the receiving host.

4. The method according to claim 1, further comprising:

observing, by the security monitors, the implemented timeouts using a trusted clock source that is secured against time alterations effected by a malicious operating system.

5. The method according to claim 4, further comprising:

instantiating a temporal variable in a runtime memory of each of the security monitors that is overwritten each power cycle.

6. The method according to claim 1, further comprising:

augmenting enclave applications with a manifest file that provides configuration information, including a maximum number of application instances that are allowed to run concurrently on a host.

7. The method according to claim 1, further comprising:

keeping consistent state on a status of the predetermined transfer protocol by means of a Crash Fault Tolerant (CFT) storage, wherein the CFT storage is run by a set of three or more security monitors including the security monitors of the sending and receiving host.

8. The method according to claim 1, wherein the predetermined transfer protocol is triggered by the security monitor of the sending host upon request of a hypervisor of the sending host.

9. The method according to claim 1, further comprising:

deriving, from the shared cryptographic key K, a first cryptographic key that is used for authenticating communication via the secure communication channel and a second cryptographic key that is used for encrypting communication via the secure communication channel.

10. A computational platform, the platform comprising:

an operating system;

a hardware component;

an enclave enabling applications to run in isolation from any other software running on the platform, the access control to contents of the enclave being protected by the hardware component; and a security monitor implemented on top of the hardware component and configured to perform enclave management and orchestration, the security monitor being further configured to:

perform attestation with a security monitor of a receiving host and exchange a shared cryptographic key K with the security monitor of the receiving host;

use the shared cryptographic key K to implement a secure communication channel with the security monitor of the receiving host;

execute via the secure communication channel a predetermined transfer protocol with the security monitor of the receiving host, the predetermined transfer protocol comprising:

an initial exchange of verification messages between the security monitors to verify that both security monitors are ready and can execute the transfer, and a subsequent transfer of enclave data between the security monitors, wherein timeouts defining a maximum admissible time duration for particular steps of the predetermined transfer protocol are implemented both for the initial exchange of the verification messages and for the subsequent transfer of the enclave data, wherein the predetermined transfer protocol is aborted if any of the implemented timeouts gets exceeded, and wherein a timeout for the transfer of enclave data is defined to comprise a network delay between the two security monitors, a time required by another party to prepare a respective response according to the predetermined transfer protocol, and a tolerance margin.

11. The platform according to claim 10, wherein the security monitor is enhanced with direct access to a trusted timer implemented in the hardware component.

12. The platform according to claim 11, wherein a temporal variable is instantiated in the runtime memory of the security monitor that is overwritten each power cycle.

13. The platform according to claim 10, wherein the security monitor is further configured to:

keep a per application counter that tracks a number of instances of a respective application deployed on the platform; and reject any request from the operating system to deploy a new instance, if the number of running instances has reached a threshold defined in a manifest file of the respective application.

14. A method for enabling enclave migration, wherein the contents of the enclave and its sealed data are transferred from a sending host, the sending host being a first machine, to a receiving host, the receiving host being a second machine, the method comprising:

performing attestation between a security monitor of the sending host and a security monitor of the receiving host, wherein the attestation comprises an exchange of a shared cryptographic key K between the two security monitors;

using the shared cryptographic key K to implement a secure communication channel between the two security monitors;

executing, by the two security monitors via the secure communication channel, a predetermined transfer protocol, the predetermined transfer protocol comprising:

an initial exchange of verification messages between the security monitors to verify that both security monitors are ready and can execute the transfer, and a subsequent transfer of enclave data between the security monitors, wherein the initial exchange of verification messages between the security monitors comprises:

sending, by the security monitor of the sending host, a prepare message to the security monitor of the receiving host, wherein the prepare message indicates a size of the enclave to be transferred; and sending, by the security monitor of the receiving host in reply to the prepare message, a ready message to the security monitor of the sending host, wherein the ready message indicates a readiness of the security monitor of the receiving host to receive the enclave to be transferred.

15. The method according to claim 14, wherein a subsequent transfer of the enclave data between the security monitors comprises:

decrypting, by the security monitor of the sending host, a set of DRAM pages D and data saved on persistent storage S that belongs to the enclave to be transferred;

re-encrypting D and S using the shared cryptographic key K; and sending encrypted D and S to the security monitor of the receiving host.

16. The method according to claim 14, further comprising:

augmenting enclave applications with a manifest file that provides configuration information, including a maximum number of application instances that are allowed to run concurrently on a host.

17. The method according to claim 14, further comprising:

keeping consistent state on a status of the predetermined transfer protocol by means of a Crash Fault Tolerant (CFT) storage, wherein the CFT storage is run by a set of three or more security monitors including the security monitors of the sending and receiving host.

18. The method according to claim 14, wherein the predetermined transfer protocol is triggered by the security monitor of the sending host upon request of a hypervisor of the sending host.

19. The method according to claim 14, further comprising:

deriving, from the shared cryptographic key K, a first cryptographic key that is used for authenticating communication via the secure communication channel and a second cryptographic key that is used for encrypting communication via the secure communication channel.

* * * * *